United States Patent
Choi

(10) Patent No.: US 12,371,001 B2
(45) Date of Patent: Jul. 29, 2025

(54) HYBRID ELECTRIC VEHICLE AND METHOD OF DRIVING CONTROL FOR SAME

(71) Applicants: Hyundai Motor Company, Seoul (KR); Kia Corporation, Seoul (KR)

(72) Inventor: Jae Young Choi, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 289 days.

(21) Appl. No.: 17/955,662

(22) Filed: Sep. 29, 2022

(65) Prior Publication Data
US 2023/0365115 A1    Nov. 16, 2023

(30) Foreign Application Priority Data
May 12, 2022    (KR) .................. 10-2022-0058494

(51) Int. Cl.
| | |
|---|---|
| B60W 10/08 | (2006.01) |
| B60K 6/26 | (2007.10) |
| B60K 6/387 | (2007.10) |
| B60K 6/40 | (2007.10) |
| B60W 10/06 | (2006.01) |
| B60W 20/10 | (2016.01) |

(52) U.S. Cl.
CPC ............... *B60W 20/10* (2013.01); *B60K 6/26* (2013.01); *B60K 6/387* (2013.01); *B60K 6/40* (2013.01); *B60W 10/06* (2013.01); *B60W 10/08* (2013.01); *B60W 2510/0208* (2013.01); *B60W 2510/081* (2013.01); *B60W 2510/082* (2013.01); *B60W 2710/0666* (2013.01); *B60W 2710/081* (2013.01); *B60W 2710/083* (2013.01); *B60Y 2200/92* (2013.01)

(58) Field of Classification Search
CPC ......... B60W 20/01; B60W 2510/0208; B60W 2510/081; B60W 2510/082; B60W 2710/0666; B60W 2710/083; B60W 10/08; B60W 20/40; B60W 10/06; B60K 6/40
USPC .................... 477/3, 5; 701/22; 180/65.285
See application file for complete search history.

(56) References Cited

U.S. PATENT DOCUMENTS

| | | | | |
|---|---|---|---|---|
| 6,083,139 A | * | 7/2000 | Deguchi | ................. B60L 50/61 |
| | | | | 477/3 |
| 6,190,282 B1 | * | 2/2001 | Deguchi | ................. B60K 6/54 |
| | | | | 180/65.23 |

(Continued)

FOREIGN PATENT DOCUMENTS

| | | |
|---|---|---|
| JP | 2000-0094973 | 4/2000 |
| KR | 102238842 | 4/2021 |

(Continued)

*Primary Examiner* — Roger L Pang
(74) *Attorney, Agent, or Firm* — Fish & Richardson P.C.

(57) ABSTRACT

The present disclosure relates to a hybrid electric vehicle and a method of driving control for the same. The method of controlling the hybrid electric vehicle includes determining whether the hybrid electric vehicle enters an engine clutch lock-up section, determining, in a case where the hybrid electric vehicle enters the engine clutch lock-up section, whether difference in speed between a first motor and a second motor is above a predetermined threshold, and controlling of torque of the first motor according to a comparison result obtained from comparing the speed of the first motor and the speed of the second motor with each other.

12 Claims, 5 Drawing Sheets

(56) References Cited

U.S. PATENT DOCUMENTS

| | | | |
|---|---|---|---|
| 9,140,343 B1 | 9/2015 | Kim et al. | |
| 2015/0298690 A1* | 10/2015 | Onouchi | B60L 50/16 180/65.265 |
| 2018/0236998 A1 | 8/2018 | Ono et al. | |
| 2019/0013721 A1 | 1/2019 | Lim et al. | |
| 2021/0016774 A1* | 1/2021 | Cho | B60W 10/08 |
| 2023/0202458 A1* | 6/2023 | Han | B60W 20/16 701/99 |

FOREIGN PATENT DOCUMENTS

| | | |
|---|---|---|
| KR | 1020210118611 | 10/2021 |
| KR | 1020210130507 | 11/2021 |

* cited by examiner

[FIG. 1]
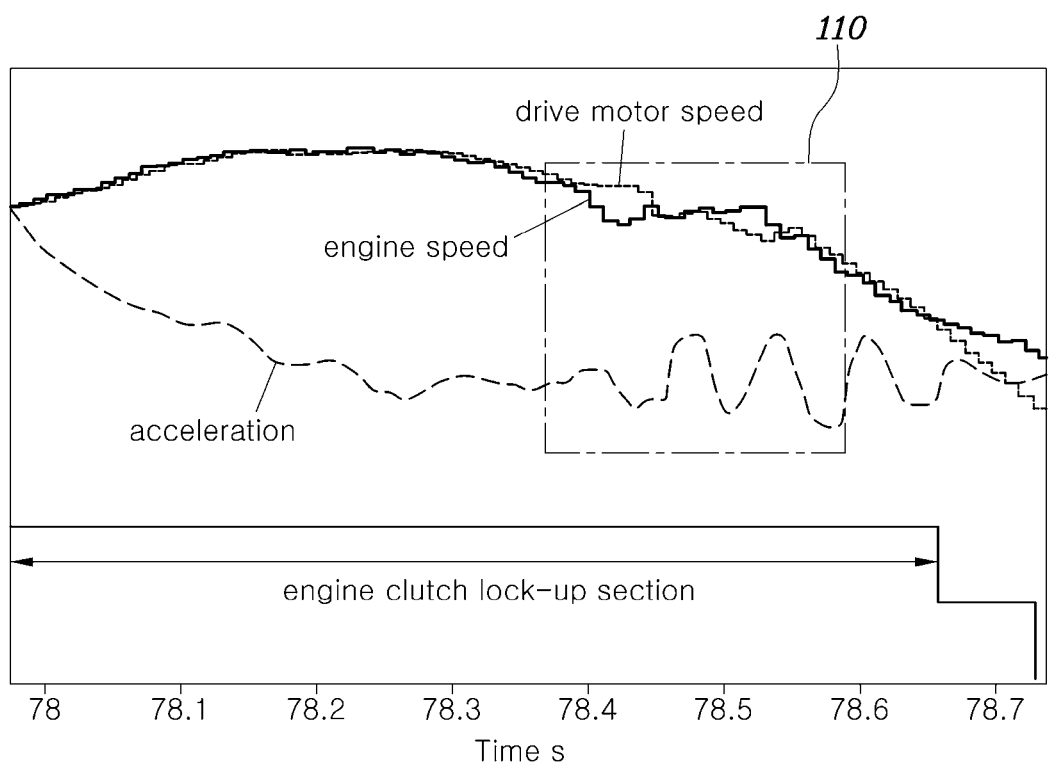

[FIG. 2]
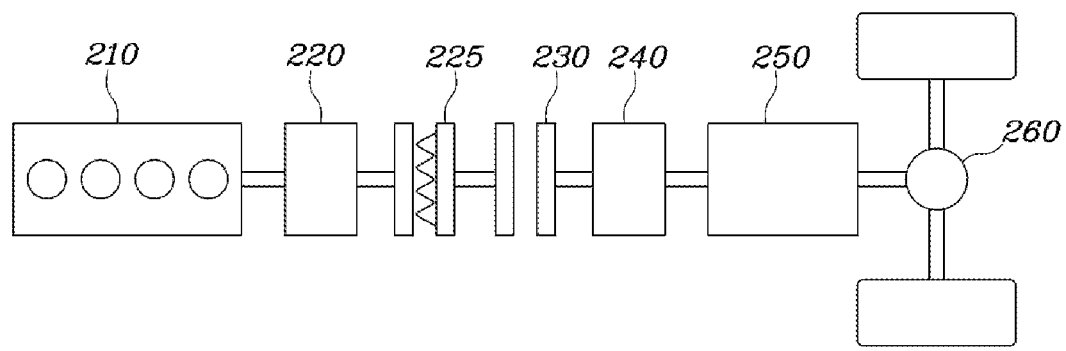

[FIG. 3]
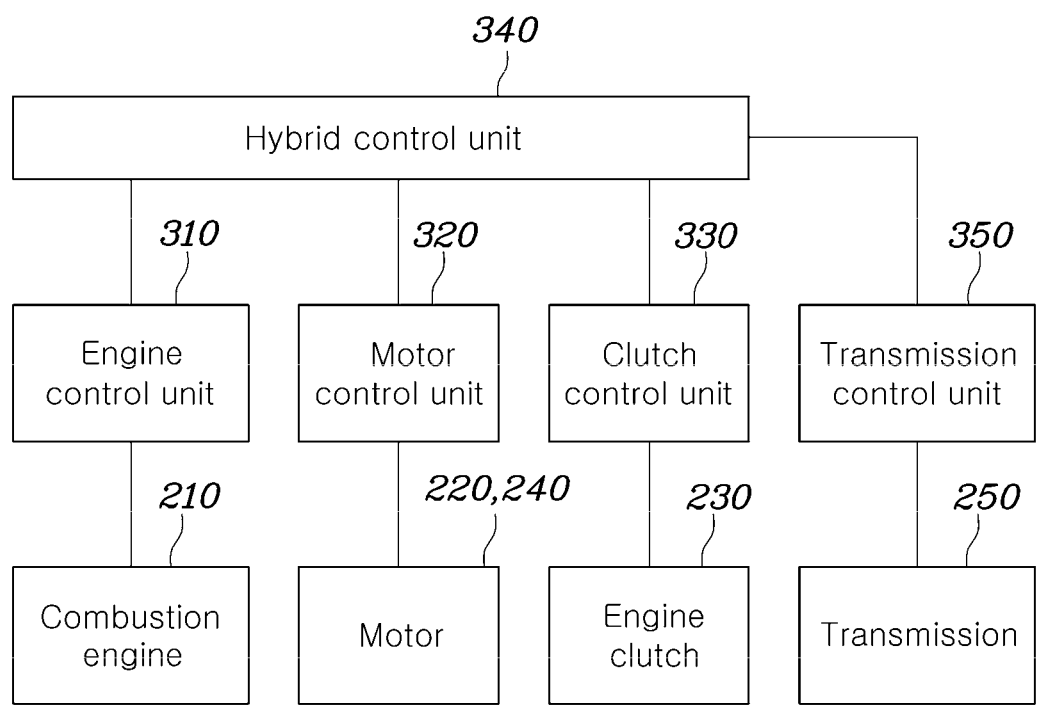

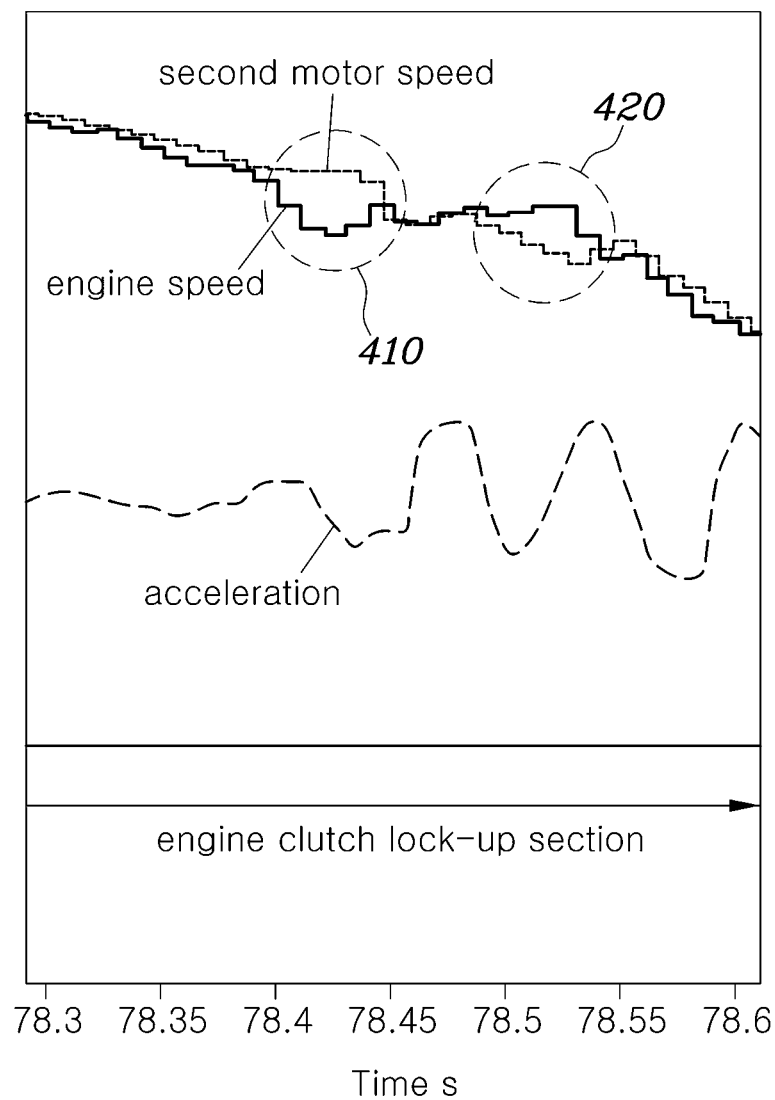
[FIG. 4]

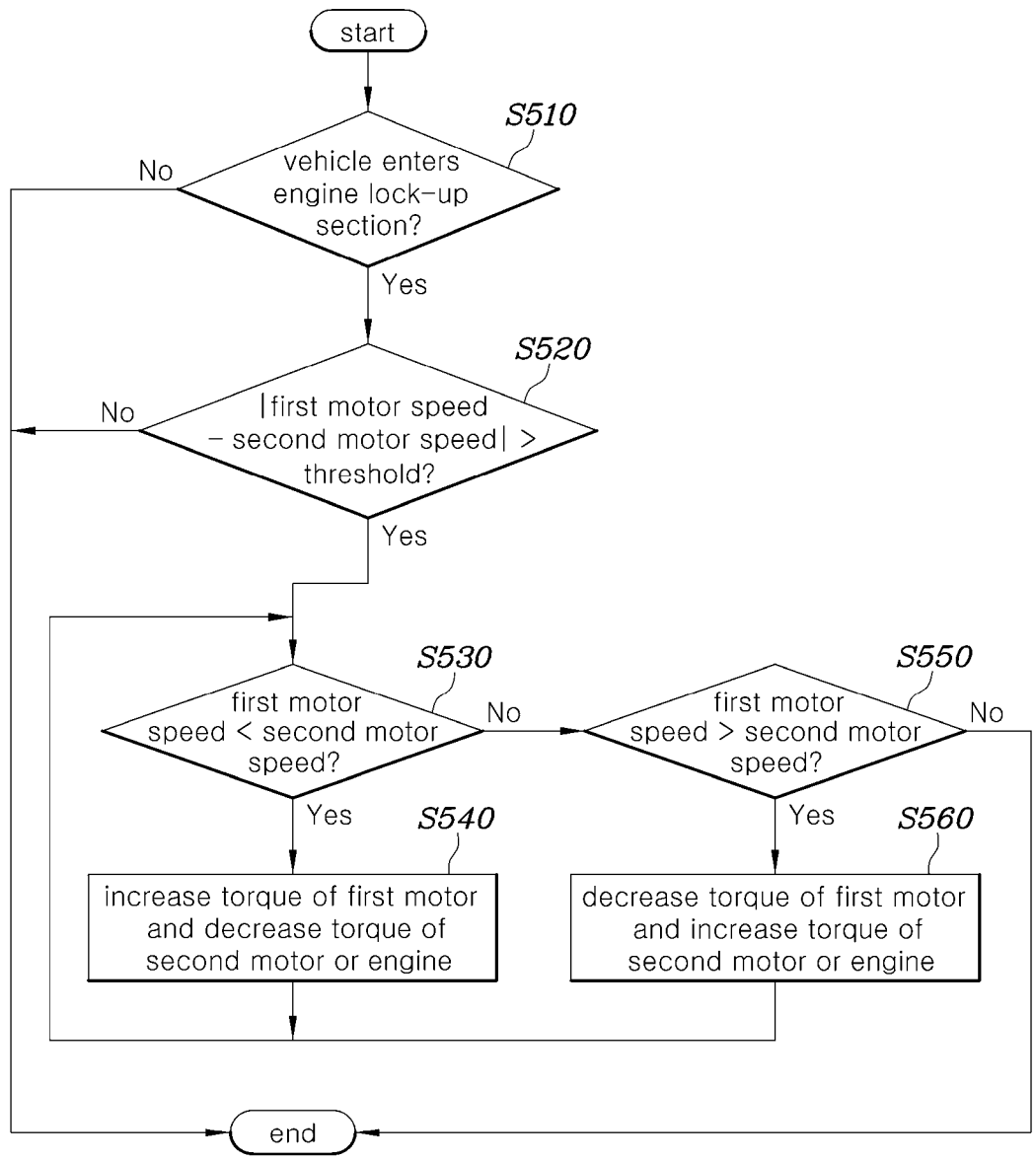
[FIG. 5]

HYBRID ELECTRIC VEHICLE AND METHOD OF DRIVING CONTROL FOR SAME

CROSS REFERENCE TO RELATED APPLICATION

The present application claims priority of Korean Patent Application No. 10-2022-0058494 filed on May 12, 2022, the entire contents of which are incorporated herein for all purposes by this reference.

TECHNICAL FIELD

The present disclosure relates to a hybrid electric vehicle and a method of driving control for the same, and specifically, to a hybrid electric vehicle and a method of driving control for the same capable of minimizing torsion of a spring inside a dual mass flywheel (DMF).

BACKGROUND

Recently, as concerns for the environment have increased, the eco-friendly vehicle equipped with electric motors as a power source has been increasing. The eco-friendly vehicles are also referred to as electrified vehicles and a hybrid electric vehicle (HEV) or an electric vehicle (EV) is a typical example of the vehicle.

Among those vehicles, the hybrid electric vehicle can improve fuel efficiency in a manner that switches modes between an EV mode and an HEV mode depending on driving conditions. The EV mode drives motors only and the HEV mode uses motors selectively while driving an engine.

In the HEV mode, the vehicle is driven by combined output torque of the engine and the motor upon locking-up of an engine clutch, and in the EV mode, the vehicle is driven by output torque of the motor only upon opening of the engine clutch.

In a vehicle equipped with an engine of the related art as a power source, a dual mass flywheel (DMF), which consists of a mass, a flywheel, a spring, and a damper, is directly connected to the engine to reduce the fluctuation during engine start-up and explosion, resulting in a stable drive.

In the gasoline-based TED HEV of the related art, at an engine clutch lock-up section as shown in FIG. 1, unintended maximum compression and tension on the springs inside the DMF are produced at a point 110 where speed difference between the engine and the drive motor (P2 motor) occurs due to difference in torque and inertia between the drive motor and the engine. Therefore, this reduces the performance of the DMF that is mainly used for less fluctuation during explosion stroke in the engine and causes malfunctions in a case where speed difference between the drive motor and the engine occurs at the engine clutch lock-up section. And on this occasion, in a case where the torque and inertia differences are reduced after the maximum compression of the springs inside the DMF, there occurs a problem in that impact is caused when the compressed spring is restored.

Accordingly, in this field of technology, there is a need for the hybrid electric vehicle and the method of driving control for the same capable of minimizing problems caused by torque and inertia differences between the engine and the drive motor.

SUMMARY OF THE DISCLOSURE

An object of the present disclosure is to provide a hybrid electric vehicle and a method of driving control for the same, which are capable of minimizing torsion of a spring inside a dual mass flywheel (DMF). The torsion of the spring may occur due to the difference in torque and inertia between an engine and a drive motor.

Objects to be solved by the present disclosure are not limited to the aforementioned objects, and the other objects not described above may be evidently understood from the following description by those skilled in the art.

A method of controlling a hybrid electric vehicle, to achieve the objects, according to an implementation of the present disclosure includes: determining whether the hybrid electric vehicle enters an engine clutch lock-up section; determining, in a case where the hybrid electric vehicle enters the engine clutch lock-up section, whether difference in speed between a first motor and a second motor is above a predetermined threshold; and controlling of torque of the first motor according to a comparison result obtained from comparing the speed of the first motor and the speed of the second motor with each other.

In the method, the controlling of the torque of the first motor according to the comparison result may include increasing of the torque of the first motor in a case where the speed of the first motor is lower than the speed of the second motor.

In the method, the controlling of the torque of the first motor according to the comparison result may further include decreasing of the torque of the second motor or torque of an engine in a case where the speed of the first motor is lower than the speed of the second motor.

In the method, the torque of the second motor or the torque of the engine may be decreased so that the decreased torque of the second motor or the decreased torque of the engine has the same torque value as the increased torque of the first motor.

In the method, the controlling of the torque of the first motor according to the comparison result may include decreasing of the torque of the first motor in a case where the speed of the first motor is higher than the speed of the second motor.

In the method, the controlling of the torque of the first motor according to the comparison result may further include increasing of the torque of the second motor or the torque of the engine in a case where the speed of the first motor is higher than the speed of the second motor.

In the method, the torque of the second motor or the torque of the engine may be increased so that the increased torque of the second motor or the increased torque of the engine has the same torque value as the decreased torque of the first motor.

In the method, the method of controlling a hybrid electric vehicle may include: determining whether the difference in angular acceleration between the first motor and the second motor is above a predetermined threshold in a case where the hybrid electric vehicle enters the engine clutch lock-up section after determining whether the hybrid electric vehicle enters the engine clutch lock-up section; and controlling of the first motor according to a comparison result obtained from comparing the angular acceleration of the first motor and the angular acceleration of the second motor with each other.

In the method, the controlling of the torque of the first motor according to the comparison result may include increasing of the torque of the first motor in a case where the angular acceleration of the first motor is lower than the angular acceleration of the second motor.

In the method, the controlling of the torque of the first motor according to the comparison result may include decreasing of the torque of the first motor in a case where the angular acceleration of the first motor is higher than the angular acceleration of the second motor.

In addition, a hybrid electric vehicle according to the implementation of the present disclosure includes: an engine; a first motor directly connected to the engine; a second motor connected to the first motor in a specific driving mode that uses driving force of the engine; an engine clutch configured to connect or no more connect the engine to the second motor; and a control unit configured to determine whether the hybrid electric vehicle enters an engine clutch lock-up section, determine whether difference in speed between a first motor and a second motor is above a predetermined threshold in a case where the hybrid electric vehicle enters the engine clutch lock-up section, and control torque of the first motor according to a comparison result obtained from comparing the speed of the first motor and the second motor with each other.

In the hybrid electric vehicle, the control unit may increase the torque of the first motor in a case where the speed of the first motor is lower than the speed of the second motor.

In the hybrid electric vehicle, the control unit may decrease the torque of the second motor or the torque of the engine in a case where the speed of the first motor is lower than the speed of the second motor.

In the hybrid electric vehicle, the control unit may decrease the torque of the second motor or the torque of the engine so that the decreased torque of the second motor or the decreased torque of the engine has the same torque value as the increased torque of the first motor.

In the hybrid electric vehicle, the control unit may decrease the torque of the first motor in a case where the speed of the first motor is higher than the speed of the second motor.

In the hybrid electric vehicle, the control unit may increase the torque of the second motor or the torque of the engine in a case where the speed of the first motor is higher than the speed of the second motor.

In the hybrid electric vehicle, the control unit may increase the torque of the second motor or the torque of the engine so that the increased torque of the second motor or the increased torque of the engine has the same torque value as the decreased torque of the first motor.

In the hybrid electric vehicle, the control unit may determine whether the hybrid electric vehicle enters the engine clutch lock-up section first, determine whether the difference in angular acceleration between the first motor and the second motor is above a predetermined threshold in a case where the hybrid electric vehicle enters the engine clutch lock-up section, and control the torque of the first motor according to a comparison result obtained from comparing the angular acceleration of the first motor and the angular acceleration of the second motor with each other.

In the hybrid electric vehicle, the control unit may increase the torque of the first motor in a case where the angular acceleration of the first motor is lower than the angular acceleration of the second motor.

In the hybrid electric vehicle, the control unit may decrease the torque of the first motor in a case where the angular acceleration of the first motor is higher than the angular acceleration of the second motor.

According to the various implementations of the present disclosure as described, the performance reduction in the DMF can be prevented. The DMF is mainly used for reducing fluctuation during explosion stroke in the engine.

Particularly, according to the present disclosure, malfunctions in control logic can be prevented by minimizing the speed difference between the drive motor and the engine.

In addition, by minimizing the torsion of the springs inside DMF, the impact is prevented when the compressed springs inside DMF are restored.

Effects to be obtained from the present disclosure are not limited to the aforementioned effects, and the other effects not described above may be evidently understood from the following description by those skilled in the art.

BRIEF DESCRIPTION OF THE DRAWINGS

FIG. 1 shows an example of a graph of an engine speed and a drive motor speed at an engine clutch lock-up section of a hybrid electric vehicle in the related art.

FIG. 2 shows an example of a power train configuration of a hybrid electric vehicle according to an example of the present disclosure.

FIG. 3 shows an example of a control system configuration of the hybrid electric vehicle according to the example of the present disclosure.

FIG. 4 shows an example of a graph of an engine speed and a drive motor speed at the engine clutch lock-up section of the hybrid electric vehicle according to the example of the present disclosure.

FIG. 5 is a flowchart illustrating an example of a process of performing motor torque control to minimize torsion of the DMF in the hybrid electric vehicle according to the example of the present disclosure.

DETAILED DESCRIPTION OF THE DISCLOSURE

Hereinafter, the present disclosure will be described in detail by describing disclosed implementations of the present specification with reference to the accompanying drawings. However, regardless of the reference character, the same or similar constituent elements shall be given the same reference number and the redundant descriptions shall be omitted. The suffixes "module" and "unit" for the constituent elements used in the descriptions below are given or mixed with the ease of the specification describing, and do not have any distinctive meaning or role in itself each other. In addition, in describing the implementations disclosed in the present specification, if it is determined that detailed descriptions of related known technologies may obscure the gist of the implementations disclosed in the present specification, the detailed description thereof will be omitted. In addition, the accompanying drawings are intended to facilitate the understanding of the implementations set forth in the present specification, not to limit the technical idea of the present specification by the accompanying drawings. All alterations, equivalents, and substitutes that are included within the technical idea and scope of the present disclosure should be understood as falling within the scope of the present disclosure.

The terms first, second, and so on may be used to describe various constituent elements, but should not be construed to impose any limitation on the meanings of the constituent elements. These terms are only used to distinguish one constituent element from another.

It should be understood that a constituent element, when referred to as being "connected to" or "coupled to" a different constituent element, may be directly connected to or directly coupled to the different constituent element or may be coupled to or connected to the different constituent element with a third constituent element in between. In contrast, it should be understood that a constituent element, when referred to as being "directly coupled to" or "directly connected to" a different constituent element, is coupled to or connected to the different constituent element without a third constituent element in between.

A noun in singular form has the same meaning as when used in plural form, unless it has a different meaning in context.

It should be understood that, throughout the present specification, the term "include," "have," or the like is intended to indicate that a feature, a number, a step, an operation, a constituent element, a component, or a combination thereof is present, without precluding the possibility that one or more other features, numbers, steps, operations, constituent elements, components, or a combination thereof will be present or added.

In addition, the term unit or control unit, which is included in the motor control unit (MCU), hybrid control unit (HCU), or the like, is a widely used term for the controller that controls vehicle-specific functions and does not refer to the Generic Function Unit. For example, each control unit can include a communication device that communicates with other control units or sensors to control assigned functions, a memory that stores an operating system or logic commands and input/output information, and one or more processors that perform the judgments, calculations, and decisions required to control assigned functions.

Prior to describing a control method of the hybrid electric vehicle according to an implementation of the present disclosure, a structure and a control system of the hybrid electric vehicle applicable to exemplary implementations will be described first.

FIG. 2 shows an example of a power train configuration of the hybrid electric vehicle according to the implementation of the present disclosure.

Referring to FIG. 2, the power train of the hybrid electric vehicle adopting a parallel type hybrid system is illustrated, and the parallel type hybrid system is provided in such a manner that two motors, that is, motors 220 and 240 and an engine clutch 230 are mounted between an internal combustion engine (ICE) 210 and a transmission 250. This parallel type hybrid system is also referred to as a transmission mounted electric drive (TMED) hybrid system because the motor 240 is permanently connected to an input end of the transmission 250.

Here, a first motor 220 of the two motors, that is, motors 220 and 240 is arranged between the ICE 210 and one end of the engine clutch 230. An engine shaft of the ICE 210 and a first motor shaft of the first motor 220 are directly connected to each other and thus can rotate together at all times.

A dual mass flywheel (DMF) 225 includes, to deliver a driving force of the ICE 210 seamlessly to the transmission 250, one flywheel connected to the first motor 220 and another flywheel connected to one end of the engine clutch 230, and a damping spring can be arranged between the two flywheels.

One end of a second motor shaft in the second motor 240 is connected to another end of the engine clutch 230, and another end of the second motor shaft can be directly connected to the input end of the transmission 250.

The second motor 240 has more torque output than the first motor 220, and thus the second motor 240 can work as a drive motor. In addition, the first motor 220 functions as a starter motor to crank the ICE 210 when the ICE 210 is started, can recover rotating energy of the ICE 210 through power generation when the ICE 210 is off, and can perform power generation by motive power of the ICE 210 while the ICE 210 is running.

As illustrated in FIG. 2, in a case where a driver presses an accelerator pedal after starting (e.g., HEV Ready) on the hybrid electric vehicle equipped with a power train, the second motor 240 is driven using a battery power first in the state of the engine clutch 230 open. Accordingly, motive power of the second motor 240 moves wheels through the transmission 250 and a final drive (FD) 260 (i.e., EV mode). At the time when more of the driving force is gradually required as the vehicle is slowly accelerated, the first motor 220 is operated and thus can crank the ICE 210.

After the ICE 210 is started, when difference in rotation speed of the ICE 210 and the second motor 240 is within a certain range, the ICE 210 and the second motor 240 rotate together in a way that the engine clutch 230 is engaged (i.e., switch to HEV mode from EV mode). Accordingly, as torque blending process is gone through, the torque output of the second motor 240 is reduced and the torque output of the ICE 210 is increased, which can meet a demanded torque of a driver. In HEV mode, most of the demanded torque can be satisfied by the ICE 210, and difference between the engine torque and the demanded torque can be compensated by at least one of the first motor 220 and the second motor 240. For example, in consideration of engine-operating efficiency, in a case where the ICE 210 outputs more torque than the demanded torque, the first motor 220 or the second motor 240 performs power generation as much as a surplus of the engine torque. And, in a case where the ICE 210 outputs less torque than the demanded torque, at least one of the first motor 220 and the second motor 240 can output the insufficient amount of torque.

In a case where the preset condition of the engine off, like a vehicle speed decrease or the like, is satisfied, the engine clutch 230 is opened and the ICE 210 is stopped (i.e., switch to EV mode from HEV mode). When decelerating, the battery is recharged by the second motor 240 using the driving force of the wheel, which is called as braking energy regeneration, or regenerative braking.

In general, the transmission 250 can be either a stepped transmission or a multi-plate clutch, for example, a dual-clutch transmission (DCT).

FIG. 3 shows an example for a control system configuration of the hybrid electric vehicle according to an implementation of the present disclosure.

Referring to FIG. 3, in the hybrid electric vehicle to which implementations of the present disclosure are applicable, the ICE 210 is controlled by an engine control unit (ECU) 310, the torque of the first motor 220 and the second motor 240 can be controlled by a motor control unit (MCU) 320, and the engine clutch 230 can be controlled by a clutch control unit 330, respectively. Here, the ECU 310 is also referred to as an engine management system (EMS). In addition, the transmission 250 can be controlled by a transmission control unit 350.

The MCU 320, based on a motor rotation angle, a phase voltage, a phase current, the demanded torque, and the like of each motor, that is, motors 220 and 240, can control a gate drive unit with a control signal provided in the form of pulse width modulation (PWM). And the gate drive unit can accordingly control an inverter that drives each motor, that is, motors 220 and 240.

Each control unit can be connected to a hybrid control unit (HCU) 340, a superior control unit, that controls the entire powertrain, including the mode switching process. And thus each controller, according to the control of the HCU 340, can provide the HCU 340 with information required to switch driving modes, control the engine clutch during a gear shift, and/or control engine stops, or can perform operations based on control signals thereof.

For example, the HCU 340 determines whether to switch between EV-HEV mode or CD-CS mode (in PHEV) depending on vehicle operation conditions. To do this, the HCU 340 can determine when to release (open) the engine clutch 230, and performs hydraulic control when the engine clutch 230 is released. In addition, the HCU 340 checks the status (lock-up, slip, open, and the like) of the engine clutch 230, and thus can control when to stop fuel injection of the ICE 210. In addition, for the engine stop control, the HCU 340 can send a torque command to the MCU 320 to control the torque of the first motor 220, and thus can control the recovery of engine rotation energy. In addition, to meet the demanded torque, the HCU 340 can check the status of each drive source, that is, drive sources 210, 220, and 240, and determines accordingly the required drive torque to be divided by the drive sources 210, 220, and 240, respectively, and can send the torque commands to the control units 310 and 320 that controls each drive source.

Of course, it would be obvious to a person of ordinary skill in the art that the described link and function/classification between the control units are exemplary descriptions and not limited to its appellations. For example, the function of HCU 340 can be implemented in a manner that is replaced by anyone of the other control units except for the HCU 340, or can be distributed across two or more of the other control units.

The described FIG. 2 and FIG. 3 are provided as an example of the hybrid electric vehicle, and thus it would be obvious to a person of ordinary skill in the art that the hybrid electric vehicle applicable to the implementation is not limited to this structure.

In an implementation of the present disclosure, it is suggested that torsion of the spring in a DMF can be minimized by torque control of the first motor 220 at the engine clutch lock-up section while driving.

First, referring to FIG. 4, in the hybrid electric vehicle according to the implementation of the present disclosure, an example of controlling the engine speed and the drive motor speed is described to minimize torsion of the spring in the DMF at the engine clutch lock-up section while driving.

FIG. 4 shows, in the hybrid electric vehicle according to the implementation of the present disclosure, an example of a graph for the engine speed and the drive motor speed at the engine clutch lock-up section.

When EV mode is switched to HEV mode while driving the hybrid electric vehicle, in a case where the speed of the ICE 210 and the speed of the second motor 240 converge within a certain range, the vehicle is driven by combined output torque of the ICE 210 and the second motor 240 upon locking up of the engine clutch. At this time, the torque of the first motor 220 engaged with the ICE 210 is increased at one point 410 where the speed of the second motor 240 is higher than the speed of the ICE 210, whereas the torque of the first motor 220 engaged with the ICE 210 is decreased at another point 420 where the speed of the second motor 240 is lower than the speed of the ICE 210. Thus, torsion of the spring in the DMF can be minimized.

FIG. 5 is a flowchart illustrating an example of a process of performing torque control to minimize torsion of the DMF in the hybrid electric vehicle according to the implementation of the present disclosure.

Referring to FIG. 5, the HCU 340 determines whether the hybrid electric vehicle enters the engine clutch lock-up section where the vehicle is switched to the HEV mode while driving in EV mode (S510).

At this time, the determination of whether or not the vehicle enters the engine clutch lock-up section can be performed, for example, by comparing the difference in speed between the ICE 210 and the second motor 240 with a predetermined threshold.

As a result of the determination in step S510, in a case where it is determined that the vehicle enters the engine clutch lock-up section, the HCU 340 determines whether or not the difference in speed between the first motor 220 and the second motor 240 is above the predetermined threshold (S520).

At this time, the determination of whether or not the difference in speed between the first motor 220 and the second motor 240 is above the predetermined threshold can be performed by determining whether the absolute value obtained by subtracting the speed of the second motor 240 from the speed of the first motor 220 is above the predetermined threshold.

Meanwhile, the first motor 220 has the same speed as the ICE 210 because the first motor 220 is directly connected to the ICE 210. Therefore, in step S520, the determination can be made in the HCU 340 by comparing the difference in speed between the ICE 210 and the second motor 240 instead of comparing the difference in speed between the first motor 220 and the second motor 240.

Meanwhile, in step S520, the HCU 340 can compare the difference in angular acceleration between the first motor 220 and the second motor 240 instead of comparing the difference in speed between the first motor 220 and the second motor 240. That is, in a case where it is determined that the hybrid electric vehicle enters the engine clutch lock-up section, the HCU 340 can determine whether the difference in angular acceleration between the first motor 220 and the second motor 240 is above the predetermined threshold.

At this time, the determination of whether or not the difference in angular acceleration between the first motor 220 and the second motor 240 is above the predetermined threshold can be performed by determining whether the absolute value obtained by subtracting the angular acceleration of the second motor 240 from the angular acceleration of the first motor 220 is above the predetermined threshold.

Meanwhile, as a result of the determination in step S510, in a case where it is not determined that the vehicle enters the engine clutch lock-up section, the operation according to the implementation of FIG. 5 ends.

As a result of the determination in step S520, in a case where the difference in speed between the first motor 220 and the second motor 240 is above the predetermined threshold, the HCU 340 compares the speed of the first motor 220 and the second motor 240 with each other, and then enters an active dual mass flywheel (DMF) control mode that controls the torque of the first motor 220 according to the result compared.

For example, the HCU 340 determines whether the speed of the first motor 220 has a lower value than the speed of the second motor 240 (S530). And then, in a case where the speed of the first motor 220 has a lower value than the speed of the second motor 240, the HCU 340 increases the torque of the first motor 220 and decreases the torque of the second motor 240 or the ICE 210 (S540).

At this time, the speed of the first motor 220 and the speed of the second motor 240 can be handled by comparing revolutions per minute (RPM) of the first motor 220 with an RPM of the second motor 240.

Referring back to FIG. 4, torsion of the spring in the DMF may happen at section 410 where the speed of the first motor 220 is lower than the speed of the second motor 240. Therefore, the RPM of the first motor 220 can be increased by performing an assist control of the first motor torque, which increases the torque of the first motor 220. And when the RPM of the first motor 220 increases, the ΔRPM decreases accordingly. The ΔRPM is the difference between the RPM of the first motor 220 and the RPM of the second motor 240.

At this time, in order to minimize the effect on the behavior of the vehicle before and after the torque control in the first motor 220, the torque of the ICE 210 or the torque of the second motor 240 can be reduced as much as the increased torque in the first motor 220. That is, the HCU 340 can control the torque of the engine or the torque of the motor in such a manner that a condition of "torque increment of the first motor 220+torque decrement of the second motor 240 (or torque decrement of the engine 210)=0" is met.

At this time, the first motor 220 has the same speed as the ICE 210 because the first motor 220 is directly connected to the ICE 210. Therefore, in step S530, the HCU 340 determines whether the speed of the ICE 210 has a lower value than the speed of the second motor 240 instead of comparing the difference in speed between the first motor 220 and the second motor 240. And then, according to the determined result, the next step S540 or S550 can be performed.

Meanwhile, in a case where the speed of the first motor 220 does not have a lower value than the speed of the second motor 240 according to the determined result in the step S530, the HCU 340 determines whether the speed of the first motor 220 has a higher value than the speed of the second motor 240 (S550). And then, in a case where the speed of the first motor 220 has a higher value than the second motor 240, the HCU 340 decreases the torque of the first motor 220 and increases the torque of the second motor 240 or the torque of the ICE 210 (S560).

At this time, the speed of the first motor 220 and the speed of the second motor 240 can be handled by comparing the RPM of the first motor 220 with the RPM of the second motor 240.

Referring back to FIG. 4, torsion of the spring in the DMF may happen at section 420 where the speed of the first motor 220 is higher than the speed of the second motor 240. Therefore, the RPM of the first motor 220 can be decreased by performing an intervention control of the first motor torque, which decreases the torque of the first motor 220. And when the RPM of the first motor 220 decreases, the ΔRPM decreases accordingly. The ΔRPM is the difference between the RPM of the first motor 220 and the RPM of the second motor 240.

At this time, in order to minimize the effect on the behavior of the vehicle before and after the torque control of the first motor 220, the torque of the ICE 210 or the torque of the second motor 240 can be increased as much as the decreased torque in the first motor 220. That is, the HCU 340 can control the torque of the engine or the torque of the motor in such a manner that a condition of "torque decrement of the first motor 220+torque increment of the second motor 240 (or torque increment of the engine 210)=0" is met.

At this time, the first motor 220 has the same speed as the ICE 210 because the first motor 220 is directly connected to the ICE 210. Therefore, in step S550, the HCU 340 determines whether the speed of the ICE 210 has a higher value than the speed of the second motor 240 instead of comparing the difference in speed between the first motor 220 and the second motor 240. And then, according to the determined result, the next step S560 can be performed or the active DMF control mode can end.

Meanwhile, as a result of the determination in step S520, in a case where the difference in speed between the first motor 220 and the second motor 240 does not exceed the predetermined threshold, the operation according to the implementation of FIG. 5 ends without entering the active DMF control mode.

According to the implementations of the present disclosure as described, the system efficiency can be improved because the torque can be distributed to the two different motors, and at the same time, not only the optimum driving point but also controlling of the torque or the system are considered.

In some cases, the present disclosure described above can be implemented as computer-readable code on the media on which the program is recorded. A computer-readable medium may include various kinds of recording devices in which computer system-readable data is stored. Non-limiting examples of the computer-readable media are hard disk drives (HDD), solid state disks (SSD), silicon disk drives (SDD), ROM, RAM, CD-ROM, magnetic tapes, floppy disks, optical data storage devices, and the like. Therefore, the detailed descriptions provided above should not be limitedly interpreted in all respects and should be considered to be exemplary descriptions. The scope of the present disclosure is determined by the legitimate construction of the following claims. All equivalent modifications to the implementations of the present disclosure fall within the scope of the present disclosure.

What is claimed is:

1. A method of controlling a hybrid electric vehicle, the method comprising:
   determining, by a controller, whether the hybrid electric vehicle enters an engine clutch lock-up section;
   determining, by the controller based on the hybrid electric vehicle entering the engine clutch lock-up section, whether difference in speed between a first motor and a second motor is above a predetermined threshold; and
   controlling, by the controller based on the difference in speed being above the predetermined threshold, a torque of the first motor according to a comparison result obtained from comparing the speed of the first motor to the speed of the second motor,
   wherein the controlling of the torque of the first motor according to the comparison result comprises:
   increasing the torque of the first motor based on a speed of the first motor being lower than a speed of the second motor.

2. The method of claim 1, wherein the controlling of the torque of the first motor according to the comparison result further comprises:
   decreasing a torque of the second motor or a torque of an engine based on the speed of the first motor being lower than the speed of the second motor.

3. The method of claim 2, wherein the torque of the second motor or the torque of the engine is decreased so that the decreased torque of the second motor or the decreased torque of the engine has the same torque value as the increased torque of the first motor.

4. The method of claim 1, wherein the controlling of the torque of the first motor according to the comparison result comprises:

decreasing the torque of the first motor based on the speed of the first motor being higher than the speed of the second motor.

5. The method of claim 4, wherein the controlling of the torque of the first motor according to the comparison result further comprises:
increasing a torque of the second motor or a torque of an engine based on the speed of the first motor being higher than the speed of the second motor.

6. The method of claim 5, wherein the torque of the second motor or the torque of the engine is increased so that the increased torque of the second motor or the increased torque of the engine has the same torque value as the decreased torque of the first motor.

7. A hybrid electric vehicle comprising:
an engine;
a first motor directly connected to the engine;
a second motor configured to be connected to the first motor in a specific driving mode that uses driving force of the engine;
an engine clutch configured to selectively connect the engine to the second motor; and
a controller configured to determine whether the hybrid electric vehicle enters an engine clutch lock-up section, determine whether difference in speed between the first motor and the second motor is above a predetermined threshold in a case where the hybrid electric vehicle enters the engine clutch lock-up section, and control a torque of the first motor according to a comparison result obtained from comparing speeds of the first motor and the second motor with each other,
wherein the controller is configured to increase the torque of the first motor in a case where the speed of the first motor is lower than the speed of the second motor.

8. The hybrid electric vehicle of claim 7, wherein the controller is configured to decrease a torque of the second motor or a torque of the engine in a case where the speed of the first motor is lower than the speed of the second motor.

9. The hybrid electric vehicle of claim 8, wherein the controller is configured to decrease the torque of the second motor or the torque of the engine so that the decreased torque of the second motor or the decreased torque of the engine has the same torque value as the increased torque of the first motor.

10. The hybrid electric vehicle of claim 7, wherein the controller is configured to decrease the torque of the first motor in a case where the speed of the first motor is higher than the speed of the second motor.

11. The hybrid electric vehicle of claim 10, wherein the controller is configured to increase the torque of the second motor or the torque of the engine in a case where the speed of the first motor is higher than the speed of the second motor.

12. The hybrid electric vehicle of claim 11, wherein the controller is configured to increase the torque of the second motor or the torque of the engine so that the increased torque of the second motor or the increased torque of the engine has the same torque value as the decreased torque of the first motor.

* * * * *